June 29, 1965
G. A. BRENNAN ETAL
3,191,961
HYDRAULIC POWER SYSTEM
Filed Feb. 20, 1963
2 Sheets-Sheet 1
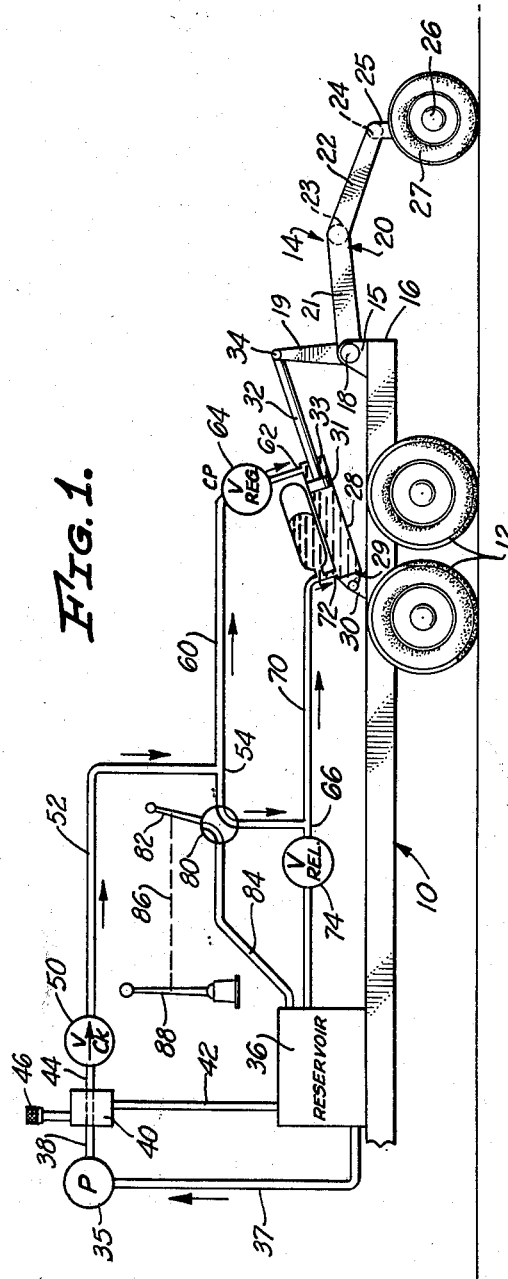
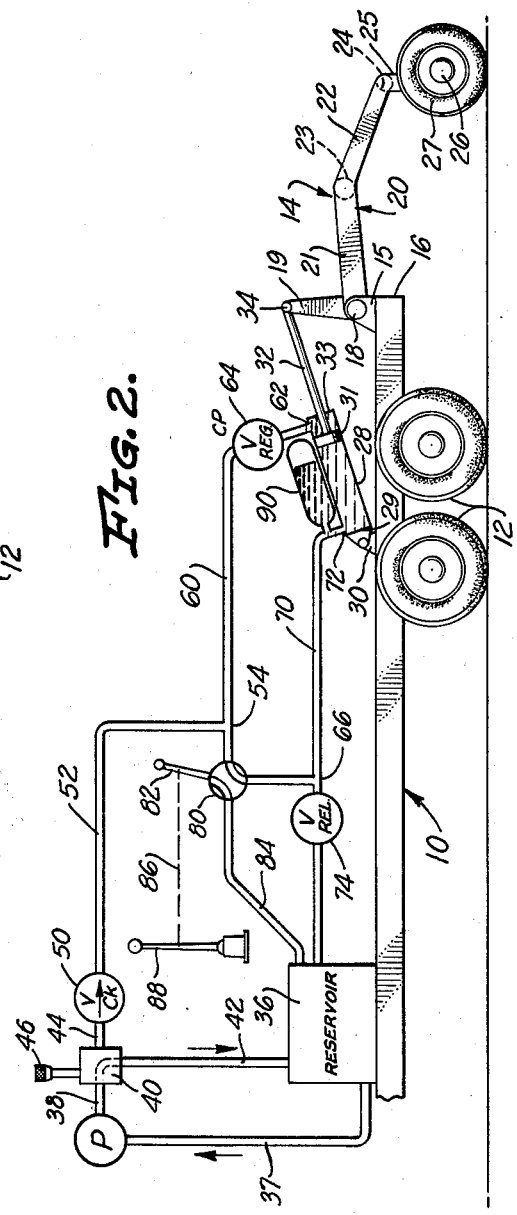
INVENTORS
GEORGE A. BRENNAN,
EVAN S. PRICHARD
BY
MAHONEY, HALBERT & HORNBAKER
ATTORNEYS June 29, 1965   G. A. BRENNAN ETAL   3,191,961
HYDRAULIC POWER SYSTEM
Filed Feb. 20, 1963   2 Sheets-Sheet 2
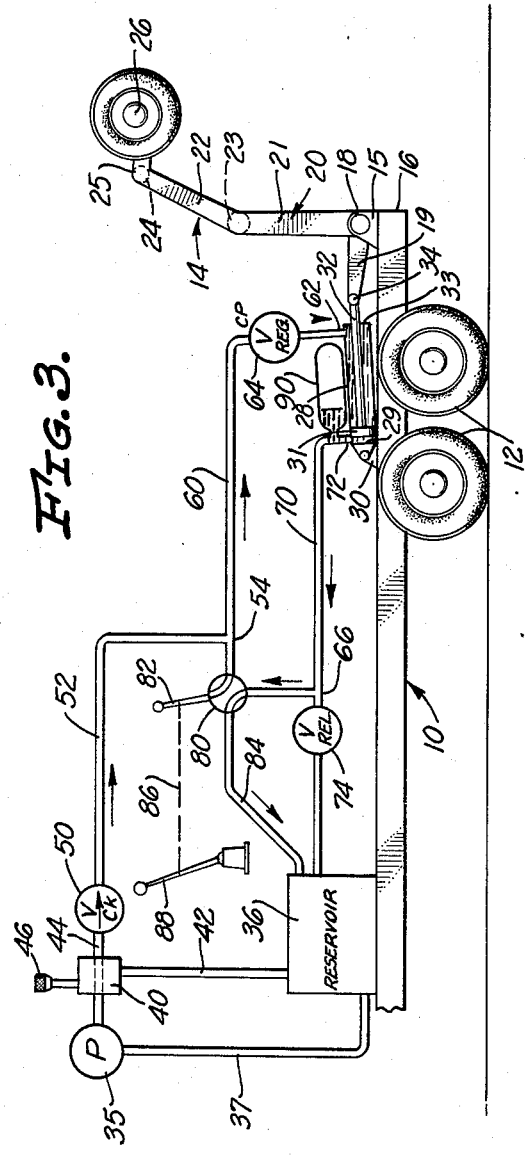
INVENTORS
GEORGE A. BRENNAN,
EVAN S. PRICHARD
BY
MAHONEY, HALBERT & HORNBAKER
ATTORNEYS

United States Patent Office 3,191,961
Patented June 29, 1965

3,191,961
HYDRAULIC POWER SYSTEM

George A. Brennan, La Mirada, and Evan S. Prichard, Newport Beach, Calif., assignors to Challenge-Cook Bros., Incorporated, Los Angeles, Calif., a corporation of California
Filed Feb. 20, 1963, Ser. No. 259,950
9 Claims. (Cl. 280—81)

This invention relates to a hydraulic power system. The invention is particularly adaptable for use in connection with a vehicular weight-load distributing device, such as that which is the subject of U.S. Patent No. 3,112,100, issued November 26, 1963, on a Truck-Trailer Transit Mixer, and of a continuation application Serial No. 224,419, filed September 18, 1962, on a Load-Carrying Vehicle, but its adaptability to other uses where adjustable hydraulic power transmission is required will be readily apparent. For ease of description and by way of illustration, but not as a limitation, the present invention is herein shown and described in its applicability to such a weight-load distributing device.

The weight-load distributing device herein illustrated and described consists of a trailing vehicle pivotally mounted on the rear of a main cargo carrying vehicle. If some of the cargo weight carried by the main vehicle can be transferred to the trailing vehicle without shifting a substantial part of the cargo thereto, improved axle weight-load distribution can be obtained, and highway axle weight-load restrictions, otherwise applicable to the main vehicle, may be overcome by the shifting of a part of the weight-load from the main vehicle axles to the trailing vehicle axle or axles. In order to accomplish this purpose, means associated with the main vehicle must be provided for exerting downward pressure on the trailing vehicle when weight-load shift is to be accomplished.

It is an object of the present invention to provide simplified means for effectively accomplishing that purpose.

A trailing vehicle such as that illustrated in the drawings and herein described has its limitations in that it extends the overall length of the combined vehicle, which may be a disadvantage when the combined vehicle is operated off-highway and cargo loading or discharge is to be undertaken. To overcome these limitations it is desirable to provide means for elevating the trailing vehicle so that it is out of ground contact.

It is a further object of the present invention to provide ready means for quickly and easily raising and lowering the trailing vehicle as desired.

Another limitation on the use of such a trailing vehicle is that when it is desired to back up the main vehicle, operating difficulties may result if the trailing vehicle is in ground-contacting position, and especially if the wheel assembly of the trailing vehicle is of the caster type.

It is, therefore, yet another object of the invention to provide a hydraulic power system connected to the gear shift of the main vehicle, and adapted to elevate the trailing vehicle automatically when the driver shifts into reverse gear.

With these and other objects in view, the invention consists of the construction, arrangement and combination of the various elements of the device whereby the objects contemplated are attained, as hereinafter set forth, pointed out in the appended claims, and illustrated in the accompanying drawings.

FIG. 1 is a diagrammatic representation of the device of the present invention installed on a vehicle having a weight-load distributing trailing vehicle, and showing the hydraulic power system operating to exert downward pressure on the trailing vehicle;

FIG. 2 is a view similar to FIG. 1, but showing the device of the present invention operating to retain downward pressure on the trailing vehicle;

FIG. 3 is a view similar to FIGS. 1 and 2, but showing the device of the present invention operating to elevate the trailing vehicle upon shifting of the gears of the main vehicle to reverse;

FIG. 4 is an enlarged view, partly in vertical cross section, showing details of the unloading valve of the device of the present invention; and FIG. 5 is a side elevational view of the manual dial control of the unloading valve shown in FIG. 4.

A body frame 10 of a load-carrying vehicle (shown partly broken away in FIGS. 1, 2 and 3 of the drawings) is supported by a rear ground-contacting wheel assembly 12.

A trailing vehicle 14, hereafter described in more detail, is generally constructed as an open framed vehicle, although for the purpose of this application only one side of the trailing vehicle 14 is illustrated. For the purpose of pivotally mounting the trailing vehicle 14 on frame 10, a pair of trunnions 15 are mounted on the frame 10 adjacent the rear end 16 of the frame 10 in aligned position on opposite sides of the frame 10, and transversely disposed between the trunnions 15 and pivotally supported thereon is a rod 18. An upwardly extending crank arm 19 is mounted on the rod 18 intermediate the trunnions 15.

Side frame members 20 of the trailing vehicle 14 are also mounted on the rod 18 adjacent the forward ends of the frame members 20. The frame members 20 may have forward portions 21 and rear portions 22 joined together so as to form an obtuse angle therebetween, and cross-frame members 23 and 24 may be provided. A king pin 25 is mounted on the cross-frame member 24, and an axle 26, bearing a ground-contacting wheel assembly 27, is mounted on the king pin 25 in any suitable manner (not illustrated).

A hydraulic cylinder 28 is pivotally connected at one end 29 thereof to a trunnion 30 on the body frame 10 forward of the trunnions 15. A piston 31 is disposed in the cylinder 28, and a piston rod 32 is mounted on the piston 31 and protrudes from the other end 33 of cylinder 28. The free end of the piston rod 32 is pivotally connected to the free end of the crank arm 19, as at 34.

A hydraulic fluid pump 35 is provided. The pump 35 may be mounted on the frame 10 at any convenient location, and it may be driven by any suitable means, such as the power take-off system of the main vehicle. A hydraulic fluid reservoir 36 is also provided, and a hydraulic fluid conduit 37 leads from the reservoir 36 to the pump 35.

A second hydraulic fluid conduit 38 leads from the pump 35 to an unloading valve 40, which is shown in some detail in FIGS. 4 and 5 of the drawings. A third hydraulic fluid conduit 42 leads from the unloading valve 40 to the reservoir 36.

A fourth hydraulic fluid conduit 44 leads from the unloading valve 40 to a check valve 50, and a fifth hydraulic fluid conduit 52 leads from the check valve 50 to a T connection 54 which is mounted intermediate the ends of a sixth hydraulic fluid conduit 60.

One end of the conduit 60 provides hydraulic fluid access to the cylinder 28 adjacent the end 33 of the cylinder 28 by way of a port 62 therein. A flow control regulator 64 is mounted on the conduit 60 intermediate the T connection 54 and the port 62. The other end of the conduit 60 leads to a T connection 66 which is mounted intermediate the ends of a seventh hydraulic fluid conduit 70.

One end of the conduit 70 provides hydraulic fluid access to the cylinder 28 adjacent the end 29 of the cylinder 28 by way of a port 72 therein. The other end of the conduit 70 leads to the reservoir 36. A relief valve 74 is mounted on the conduit 70 intermediate the T connection 66 and the reservoir 36.

A directional control valve 80 is mounted on the conduit 60 intermediate the T connection 54 and the T connection 66. The directional control valve 80 has a control lever 82 which is disposed so as to be readily accessible for manual operation. An eighth hydraulic fluid conduit 84 leads from the directional control valve 80 to the reservoir 36.

The control lever 82 of the directional control valve 80 is connected by a mechanical interlock 86 to a gear shift lever 88, which is a standard automotive vehicle gear shift lever.

A hydraulic accumulator 90 is mounted on the conduit 70 intermediate the port 72 and the T connection 66.

The unloading valve 40 is a standard hydraulic unloading valve. It has a knurled adjustment cap 46 which is disposed at an accessible location for ready adjustment of the valve 40. Adjacent the cap 46 the outside surface of the valve 40 is calibrated for various load weights or capacities as shown at 47 on FIG. 5 of the drawings, and an indicator 48 on the cap 46 points to the calibrations 47 so that, in the manner hereinafter described, the hydraulic system of the present invention can be readily adjusted to compensate for changing loads. As best illustrated in FIG. 5 of the drawings, when the system of the present invention is used, for instance, on a transit mixer, the hydraulic system can be easily adjusted for pressurizing the trailing vehicle according to the number of yards of aggregate mix carried by the mixer drum supported on the main vehicle.

As an example, if seven yards of aggregate mix are being carried in the drum, a given amount of hydraulic pressure will be required to adequately shift weight-load to the trailing vehicle, whereas if nine and one-half yards of aggregate mix are being carried in the drum, additional hydraulic power will be required. The setting of the unloading valve 40 to indicate nine and one-half yards, as illustrated in FIG. 5 of the drawings, will adjust the hydraulic pressure accordingly.

In operation, when the weight-load of the cargo is determined, and it is desired to shift part of the weight-load to the trailing vehicle, the unloading valve 40 is set to the proper indication, the directional control valve 80 is opened, and the pump 35 is activated. The pump 35 will draw hydraulic fluid from the reservoir 36 and pump it to the unloading valve 40. The unloading valve 40 will pass fluid under pressure through conduit 44, through check valve 50, and through conduit 52 (at which time the unloading valve 40 has closed the conduit 42 to the reservoir 36).

The hydraulic fluid under pressure in conduit 52 will flow through the T connection 54 into the conduit 60. The conduit 60 will in turn pass the hydraulic fluid through the T connection 66 into the conduit 70, the directional control valve 80 being open. Return of the hydraulic fluid to the reservoir 36 will be blocked by the relief valve 74, and consequently the hydraulic fluid under pressure will pass through conduit 70 and the port 72 into the cylinder 28 adjacent the end 29 of the cylinder 28 and in back of the piston 31. At the same time, hydraulic fluid under pressure will pass through conduit 60 and the port 62 into the cylinder 28 adjacent the end 33 of the cylinder 28 and in front of the piston 31, the hydraulic pressure on each end being equal. However, the area over which the hydraulic pressure is distributed is behind the piston 31 adjacent the end 29 of the cylinder 28, being greater than the area in front of the piston 31 adjacent the end 33, due to the displacement of the piston rod 32 and, since the force exerted by the piston 31 is the product of "pressure×area," the force directing the piston 31 toward end 33 of the cylinder 28 is greater than the force directing the piston 31 in the opposite direction. Therefore, the piston 31 will thus be moved in the cylinder 28 in the direction of the end 33 of the cylinder 28 to extend the piston rod 32, which in turn will bear against the crank arm 19, and through the interconnection of the crank arm 19, the rod 18, and the side frame members 20 of the trailing vehicle 14, downward pressure will be exerted on the trailing vehicle 14.

Under these conditions, the speed of flow of the hydraulic fluid in the conduit 60 will be controlled by the flow control regulator valve 64.

When the hydraulic pressure in the system has reached its proper level of exertion of pressure on the trailing vehicle 14, the unloading valve 40 will adjust to maintain the pressure in the conduits 44, 52, 60 and 70, and the conduit 42 may be opened to permit hydraulic fluid to pass from the unloading valve 40 to the reservoir 36 if required to maintain proper pressures in said conduits 44, 52, 60 and 70.

When it is desired to elevate the trailing vehicle 14 by manual adjustment, the directional control valve 80 is adjusted by manipulation of the control lever 82, whereupon the flow of the hydraulic fluid under pressure from the conduit 60 into the conduit 70 will be blocked, and at the same time the hydraulic fluid pressure in the conduit 60 will pass through the flow control valve 64 and the port 62 into the cylinder 28 adjacent the end 33 of the cylinder 28 and ahead of the piston 31. With the effective pressure relieved in the cylinder 28 adjacent the end 29 of the cylinder 28 and behind the piston 31, and with pressure in conduit 70 bleeding off through relief valve 74 to the reservoir 36, the pressure in the cylinder 28 adjacent the end 33 of the cylinder 28 and ahead of the piston 31 will force the piston 31 toward the end 29 of the cylinder 28, thus retracting the piston rod 32 which in turn, by reason of its connection with the crank arm 19 and the interconnection of the crank arm 19 with the trailing vehicle 14, will cause the trailing vehicle 14 to elevate.

Under all operating conditions, any excess pressure in the system will bleed off hydraulic fluid from the directional control valve 80 through the conduit 84 to the reservoir 36 and from the conduit 70 through the relief valve 74 to the reservoir 36.

As illustrated in FIG. 3 of the drawings, by reason of the mechanical interlock 86 between the control lever 82 of the directional control valve 80 and the gear shift lever 88, the elevation of the trailing vehicle 14 hereinabove described may be automatically accomplished when the gear shift lever 88 is moved to reverse position.

The hydraulic accumulator 90 serves to adjust the hydraulic system to compensate for unevenness in the highway. For instance, a sharp bump in the road will, of course, sharply and temporarily increase the hydraulic pressure exerted on the trailing vehicle 14. This sharp and temporary increase in pressure will be compensated by the hydraulic accumulator 90. Similarly, a depression in the highway will sharply and temporarily decrease the hydraulic pressure, and again this change in pressure will be compensated by the hydraulic accumulator 90.

Although the invention has been herein shown and described in what are conceived to be the most practical and preferred embodiments thereof, it is recognized that departures may be made therefrom within the scope of the invention, which is not to be limited to the details disclosed herein, but is to be accorded the full scope of the claims so as to embrace any and all equivalent structures and devices.

We claim:

1. In combination with a vehicle, a hydraulic fluid pressure system for a vehicular weight-load distributing device which comprises: a hydraulic fluid reservoir mounted on a vehicle body frame; a pump connected to the reservoir; an unloading valve connected to the pump and to the reservoir; adjustable control means mounted on the unloading valve; a directional control valve; a hydraulic cylinder pivotally mounted at one end thereof to the vehicle body frame; a piston slidably disposed in the cylinder for reciprocal movement therein; a piston rod connected to the piston and protruding from the cylinder, the free end of the piston rod being pivotally mounted on a trailing vehicle pivotally mounted on the vehicle body frame so that movement of the piston and the piston rod in one direction will exert downward pressure on the trailing vehicle, and movement of the piston and the piston rod in the other direction will elevate the trailing vehicle clear of the ground; a first conduit leading from the directional control valve to one end of the cylinder; a second conduit leading from the directional control valve to the other end of the cylinder; adjustable control means mounted on the control valve for alternately directing effective fluid flow into either end of the cylinder to move the piston; means for relieving hydraulic pressure in the control valve; means for returning fluid in the second conduit to the reservoir; and a third conduit leading from the unloading valve to the first conduit.

2. The combination of claim 1, including: a gear shift lever mounted on the vehicle; and a mechanical interlock between the gear shift lever and the control means of the directional control valve for operating the directional control valve upon movement of the gear shift lever so as to apply hydraulic pressure to the cylinder.

3. The combination of claim 2, including: a check valve interposed between the unloading valve and the directional control valve; a flow control regulator mounted on the first conduit intermediate the directional control valve and the cylinder; and a relief valve mounted on the means for relieving hydraulic pressure in the first conduit and the second conduit.

4. The combination of claim 3, including: a hydraulic accumulator mounted on the second conduit so as the cushion the downward hydraulic pressure applied to the trailing vehicle.

5. In combination with a vehicle, a hydraulic fluid pressure system for a vehicular weight-load distributing device which comprises: a hydraulic fluid reservoir supported by the body frame of a cargo-carrying vehicle; a pump connected to the reservoir; an unloading valve connected to the pump and to the reservoir; adjustable control means mounted on the unloading valve, the control means including calibrations related to the weight-load of the cargo; a direction control valve; a hydraulic cylinder pivotally mounted at one end thereof to the body frame of the vehicle; a piston slidably disposed in the cylinder for reciprocal movement therein; a piston rod connected to the piston and protruding from the cylinder, the free end of the piston rod being pivotally mounted on a trailing vehicle pivotally mounted on the body frame of the cargo-carrying vehicle so that movement of the piston and the piston rod in one direction will exert downward pressure on the trailing vehicle, said downward pressure being controlled by the calibrations setting of the unloading valve, and movement of the piston and the piston rod in the other direction will elevate the trailing vehicle clear of the ground; a first conduit leading from the directional control valve to the cylinder at one side of the piston; a second conduit leading from the directional control valve to the cylinder at the other side of the piston; adjustable control means mounted on the control valve for alternately directing effective fluid flow into either end of the cylinder to move the piston; and means for relieving hydraulic pressure in the control valve and the second conduit by returning fluid to the reservoir; and a third conduit leading from the unloading valve to the first conduit.

6. The combination of claim 5, including: a gear shift lever mounted on the cargo-carrying vehicle; and a mechanical interlock between the gear shift lever and the control means of the directional control valve for operating the directional control valve so that when the gear shift lever is moved to forward gear position, hydraulic pressure will be applied to the cylinder to extend the piston rod and exert downward pressure to the trailing vehicle, and when the gear shift lever is moved to reverse gear position, hydraulic pressure will be applied to the cylinder to retract the piston rod and elevate the trailing vehicle clear of the ground.

7. The combination of claim 6, including: a check valve interposed between the unloading valve and the directional control valve; a flow control regulator mounted on the first conduit intermediate the directional control valve and the cylinder; and a relief valve mounted on the means for relieving hydraulic pressure in the first conduit and the second conduit.

8. The combination of claim 7, including: a hydraulic accumulator mounted on the second conduit so as to cushion the downward hydraulic pressure applied to the trailing vehicle.

9. A hydraulic fluid power system mounted on a motor vehicle for operating a reciprocal piston which comprises: a hydraulic fluid reservoir mounted on the vehicle; a pump connected to the reservoir; an unloading valve connected to the pump; a directional control valve; a hydraulic cylinder; a first conduit leading from the unloading valve to a second conduit, said second conduit leading from the directional control valve to one end of the cylinder; a third conduit leading from the directional control valve to the other end of the cylinder; a piston disposed for reciprocal movement in the cylinder intermediate the ends of the cylinder; a piston rod connected to the piston and protruding from the cylinder; means for adjusting the control valve for alternately directing effective fluid flow into either end of the cylinder by way of the second conduit or the third conduit; means for relieving hydraulic pressure in the control valve and the third conduit by returning fluid in the control valve and the third conduit to the reservoir; a gear shift lever mounted on the vehicle; and a mechanical interlock between the gear shift lever and the directional control valve for operating the directional control valve upon movement of the gear shift lever.

References Cited by the Examiner

UNITED STATES PATENTS

| | | | |
|---|---|---|---|
| 1,990,052 | 2/35 | Sosa | 60—52 |
| 2,360,901 | 10/44 | Simmons | 280—406 |
| 2,360,902 | 10/44 | Simmons | 280—406 |
| 2,459,098 | 1/49 | Simmons | 280—406 |
| 2,708,044 | 5/55 | Sher. | |
| 2,864,625 | 12/58 | Clements | 280—42.23 |
| 2,974,976 | 3/61 | Lyall | 280—405 X |
| 3,006,660 | 10/61 | Merz | 280—406 |
| 3,073,464 | 1/63 | Hoover | 280—406 |

A. HARRY LEVY, *Primary Examiner.*

LEO FRIAGLIA, *Examiner.*